March 8, 1960  R. G. ALLEN ET AL  2,927,886
ELECTRODE AND MANUFACTURE THEREOF
Filed Jan. 25, 1956
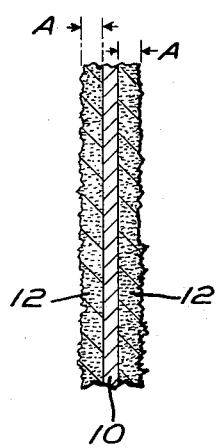
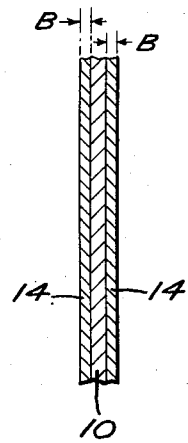
INVENTORS:
RICHARD G. ALLEN and
ANTHONY J. ANDOLINO
BY:
Beau, Brooks, Buckley & Beau,
ATTORNEYS.

United States Patent Office 2,927,886
Patented Mar. 8, 1960

2,927,886
ELECTRODE AND MANUFACTURE THEREOF

Richard G. Allen, East Aurora, and Anthony J. Andolino, North Collins, N.Y., assignors to Gould-National Batteries, Inc., Depew, N.Y.

Application January 25, 1956, Serial No. 561,382

2 Claims. (Cl. 204—35)

This invention relates to improvements in positive electrodes of silver peroxide type as used in various types of primary and secondary cells and batteries. Silver peroxide electrodes of this type are employed together with zinc for example as the negative active material, and a solution of potassium hydroxide as the preferred electrolyte. Such so-called "silver" batteries are particularly useful where large watt outputs per unit of weight and volume are required, and where nearly constant voltage at very high discharge rates is desired.

Conventional methods for producing silver peroxide electrodes include pasting silver chloride or silver oxide into suitable grids. The silver oxide paste may be made from a mixture of powdered silver peroxide and a dilute solution of potassium hydroxide. After drying, the plates are discharged electrolytically to sponge silver and then electrolytically oxidized in a solution of potassium hydroxide, as is well known in the art.

It is extremely difficult, when using such methods to successfully make thin and uniform plates. A thin wire screen is commonly used as the grid into which the silver compound is pasted. However, subsequent drying and forming of these electrodes usually leads to crumbling and falling of the active material out of the grid, thus causing loss of active material; non-uniform plates; erratic plate capacities, and generally reducing the effectiveness of the cell.

Another conventional method of silver peroxide electrode production involves the pasting of finely divided silver oxide onto a suitable metallic support. The resulting composite structure is then thermally treated in the neighborhood of 400° C. to cause reduction of the oxide to metallic silver and its subsequent sintering. The plate is then electrolytically oxidized in an alkaline hydroxide solution to form a peroxidized plate. However, shrinkage of the pasted oxide during the previous thermal treatment results in cracks, fissures and loss of bond to the support structure. Since the bonding of the silver or silver oxide to the support structures is primarily mechanical, it is customary to use perforated, woven or meshed metallic supports in order to promote the mechanical bonding insofar as is possible in the aforementioned practices.

It is an object of this invention to overcome the above mentioned and other difficulties in the production of silver peroxide electrodes by a method which, broadly speaking, consists in directly electroplating porous, fibrous silver on the structure which is to act as a collector of electrical current and electrode active material support. The invention permits production of electrodes of controlled thickness and density; allows use of support structure configurations substantially independent of mechanical support requirements, and has economic advantages as to ease and speed of manufacture and uniformity of product. It has been found that the advantages of the invention may be obtained without other adverse effects, compared to electrodes made by prior methods.

In the drawing, Fig. 1 is a fragmentary sectional view illustrating at an intermediate stage of its construction, an electrode under fabrication in accord with the method of the present invention; and Fig. 2 is a corresponding sectional view illustrating the electrode in finished form.

In practicing this invention a support structure of electro-conductive form is electroplated with a special form of silver. For example the support may be silver of solid sheet or perforated or "expanded" sheet or wire mesh fabric form, or may be a silver-plated core of any suitable material and form; or it may be of solid nickel or nickel plated form, as designated 10 in the accompanying drawing. A typical silver plating bath may be employed, or be modified to achieve the desired results. For example, the plating solution may consist of AgCN—4 oz./gallon and 7.5 oz./gallon of KCN. This solution should have a specific gravity not exceeding 1.085 at 70° F. To this solution an excess of KCN is added as electroplating occurs so that a solution gravity of about 1.085 is maintained during the deposition process.

The current density during the plating operation is critical in order to achieve silver deposits having desirable adhesion to the support structure without being too high or too low in porosity for effective subsequent electrode performance in a battery. It has been found for example, with expanded silver sheet (0.005" thick) as a support structure, 1 to 2 amperes per square inch of cathode area resulted in satisfactory deposits. Lower current densities caused silver deposition in undesirably hard and non-porous form. Higher current densities resulted in severe lowering of the plating anode efficiencies, and caused uneven deposits.

It was further found that the plating solution must be slowly agitated, both prior to and during the actual electrodeposition process. Preferably, this agitation is generally localized near the bottom of the electroplating bath since too much agitation in the area of metal deposit causes rough and irregular silver deposition. It was further found that more uniform silver deposits were formed when the silver anodes of the plating bath were narrower than the cathode of that bath.

After an adequate weight of silver has been deposited, as illustrated at 12—12 Fig. 1, say for example to a thickness of 0.05", the structure is removed from the plating bath; thoroughly washed; and then pressed to the electrode dimensional and density requirements, such as to a thickness of 0.035". The electrode is then electrolytically oxidized in a suitable alkaline hydroxide solution, as is well known in the art, for example as disclosed in U.S. Patent 2,615,930.

What is claimed is:
1. A method of making a cell positive electrode of oxidized silver form comprising placing a support structure of substantially non-porous electrically conductive material in a silver plating bath solution comprising silver cyanide and potassium cyanide, the solution having a specific gravity not exceeding 1.085 at 70 degrees F., electro-depositing a layer of spongy silver on the support structure and adding potassium cyanide as such electro-depositing occurs so as to maintain the specific gravity of the solution below 1.085 during the deposition process, slowly agitating the solution during the electrodeposition process, compressing said spongy silver layer, and then electrically oxidizing said layer in an alkaline hydroxide solution.

2. The method as defined in claim 1, wherein said silver plating bath solution comprises approximately four ounces silver cyanide per gallon and 7.5 ounces of potassium cyanide per gallon.

References Cited in the file of this patent

UNITED STATES PATENTS

| | | |
|---|---|---|
| 273,492 | Edison | Mar. 6, 1883 |
| 585,359 | Hopfner | June 29, 1897 |
| 793,078 | Hubbell | June 27, 1905 |
| 897,833 | Hubbell | Sept. 1, 1908 |
| 2,391,039 | Schaefer | Dec. 18, 1945 |
| 2,431,947 | Martz | Dec. 2, 1947 |
| 2,435,525 | Williams et al. | Feb. 3, 1948 |
| 2,561,943 | Moulton et al. | July 24, 1951 |
| 2,653,179 | Baldwin | Sept. 22, 1953 |
| 2,700,693 | Fischbach | Jan. 25, 1955 |